United States Patent [19]
Hofer et al.

[11] Patent Number: 4,942,564
[45] Date of Patent: Jul. 17, 1990

[54] SERVO SYSTEM GAIN COMPENSATION METHOD FOR MAGNETO-OPTIC DISK DRIVES

[75] Inventors: Gregory V. Hofer, Colorado Springs; James C. McDonald, Black Forest, both of Colo.

[73] Assignee: Hewlett-Packard Company, Palo Alto, Calif.

[21] Appl. No.: 265,219

[22] Filed: Oct. 31, 1988

[51] Int. Cl.$^5$ ............................................. G11B 7/00
[52] U.S. Cl. ...................................... 369/58; 369/54; 369/44.11; 369/44.21
[58] Field of Search ............... 360/114, 77.04; 369/32, 369/33, 43–47, 53–58, 13

[56] References Cited
U.S. PATENT DOCUMENTS

| | | | |
|---|---|---|---|
| 4,700,056 | 10/1987 | Silvy et al. | 250/201 |
| 4,764,860 | 8/1988 | Takao | 369/43 |
| 4,841,506 | 6/1989 | Kiyoura et al. | 369/32 |

Primary Examiner—Robert L. Richardson

[57] ABSTRACT

A method for operating a programmable digital signal processor in an optical disk drive to compensate tracking and/or focus servo system gain each time a new disk is inserted. The digital signal processor receives a servo error signal and outputs a servo control signal. Data characteristic of a desired servo system gain at a predetermined test frequency is stored in memory. The digital signal processor generates a test signal at the test frequency and sums the test signal with the servo error signal. Servo system gain at the test frequency is determined by computing the ratio of the amplitude of the servo error signal before it is summed with the test signal and the amplitude of the summed servo error signal and test signal. A corrected gain factor is computed as a function of the current servo system gain, the desired servo system gain and current gain factor. The corrected gain factor is stored in memory. The servo error signal is thereafter multiplied by the gain factor so servo system gain equals the desired servo system gain.

21 Claims, 3 Drawing Sheets

SERVO SYSTEM GAIN COMPENSATION METHOD FOR MAGNETO-OPTIC DISK DRIVES

BACKGROUND OF THE INVENTION

1. Field of the Invention

The present invention relates generally to optical disk drive tracking and focus servo systems. In particular, the present invention is a method for gain compensating tracking and focus servo systems of a magneto-optic disk drive.

2. Description of the Prior Art

Magneto-optic data recording technology combines the erasability features of magnetic data storage systems with the high data storage capacity of optical systems. A 5.25 inch magneto-optic disk can hold up to 600M bytes of information, 1000 or more times the amount of information that a similarly sized magnetic floppy diskette can store. Magneto-optic disks are also transportable and can be transferred between drives. Since the reading, writing and erasing operations are performed with light beams rather than magnetic heads, they have long life, high reliability, and are relatively immune to physical wear.

The principles of magneto-optic technology are well known. Information is digitally stored at bit positions on a magneto-optic disk. The orientation of the magnetic field at each bit position can be switched between a first or digital one state in which its north pole is oriented upward, and a second or digital zero state in which the magnetic field is reversed and the north pole oriented downward. The orientation of the magnetic field at each bit position is selected by subjecting the bit position to a magnetic field of the appropriate polarity, and heating the bit position of the disk. The magnetic orientation of the bit position is "frozen" when the disk cools and returns to room temperature.

The magnetic fields of all bit positions in an unwritten disk will generally be oriented north poles down to represent digital zeros. When writing information, the bit positions will be subjected to a write magnetic bias field and heated by a high intensity laser beam. The orientation of the magnetic fields at the written bit positions will reverse to north poles up. Bit positions are erased by subjecting them to an erase bias field of the opposite polarity, and again heating the bit position. The magnetic field orientation at the erased bit positions will then reverse and switch to north poles down.

Data is read from the optical disk using a low-power or read intensity laser beam. Because of the magneto-optic phenomenon known as the Kerr Effect, the polarization of a laser beam impinged upon the bit positions will be rotated as a function of the magnetic orientation of the bits. The polarization of laser beam portions reflected from bit positions on the optical disk is detected by opto-electronic detector circuitry. Signals from the detector circuitry are then processed to determine whether the bit position is representative of a digital one or zero.

Bit positions are aligned adjacent one another in an elongated servo track on the optical disk. The optical disk can include a single servo track which is spirally positioned on the disk, or a plurality of concentrically positioned servo tracks. The laser beam used to read, write and erase data at the bit positions is focused onto the disk by an objective lens. Optical disk drives of this type typically include a focus servo system for driving the objective lens about a focus axis, to keep the laser beam in focus the disk. A tracking servo system is used to drive the objective lens along a tracking axis perpendicular to the servo tracks, and to maintain the laser beam centered over a desired servo track.

Tracking and focus servo systems for optical disk drives are generally known and illustrated, for example, in the Silvy et al. U.S. Pat. No. 4,700,056. After the laser beam has been modulated by the individual bit positions, it is reflected from the optical disk and impinged upon an optical detector. Circuitry coupled to the optical detector produces both tracking and focus error signals. The focus error signal is generally sinusoidally shaped and has a magnitude and polarity which represent the distance and direction, respectively, from which the objective lens is displaced from proper focus. Similarly, the tracking error signal is a sinusoidal signal having a magnitude and polarity representative of the distance and direction by which the laser beam is offset from the center of a desired servo track.

The focus and tracking error signals are processed by the servo systems to generate focus and tracking drive signals. The focus and tracking drive signals are applied to respective actuators or motors, and cause the objective lens to be driven to a position which minimizes the focus and tracking errors. Typical processing steps performed on the focus and tracking error signals include the addition of an offset value to compensate for electrical, optical and/or mechanical offsets in the drive, and the multiplication of the error signal by a gain factor to control servo system bandwidth. The error signal is also compensated by lag-lead and/or lead-lag filters for proper frequency characteristics before being applied to the actuator as a drive signal.

Known optical disk drives of the type described above typically use discrete circuit elements for processing the focus and tracking error signals to produce the respective focus and tracking drive signals. The gain factor is adjusted and set by means of a potentiometer during initial setup or calibration of the drive, following its assembly. This procedure is performed by a technician who applies an externally generated test signal having predetermined frequency characteristics to the servo system, and who monitors or records the transfer function or response of the servo system at the frequency of the test signal. From observing the monitored response, and knowing the desired servo system gain at the frequency of the test signal, the technician can adjust the potentiometer to set the gain factor and bring the servo system bandwidth to within required specifications.

From the foregoing description it is evident that known techniques for adjusting servo system gain factors are relatively time consuming and will add to the overall expense of the drive. Since the required gain factor is dependent upon the optical characteristics of the disk, and in particular, variations in track groove geometries, the disk drive is typically used only with a particular type of disk for which it was calibrated. Furthermore, the servo system bandwidth will change as the characteristics of mechanical, electrical, and optical components of the drive vary with age. A service call would generally be necessary to readjust the gain factor.

It is evident that there is a continuing need for improved disk drive servo system gain compensation systems. In particular, what is needed is an adaptable servo system gain compensation system which can accommodate changing characteristics of the drive's mechanical, electrical and optical components, and varying media optical characteristics.

A SUMMARY OF THE INVENTION

The present invention is a method for operating programmable processing means in an optical disc drive to compensate servo system gain. The processor receives a servo error signal and outputs a servo control signal. Data characteristic of the desired servo system gain at a predetermined test frequency is stored in memory. A test signal having the test frequency is generated and summed with the servo error signal. The servo system gain at the test frequency is determined, and a gain factor is computed as a function of the current servo system gain, the desired servo system gain, and a current gain factor. Data characteristic of the computed gain factor is then stored in memory. The servo error signal is multiplied by the gain factor so servo system gain equals the desired servo system gain.

In one embodiment the current servo system gain is found by determining amplitude of the servo error signal before it is summed with the test signal, and determining amplitude of the summed servo error signal. Current servo system gain is determined by computing the ratio of the amplitude of the servo error signal and the amplitude of the summed servo error signal and test signal. The gain factor is computed as a function of current servo system gain, desired servo system gain, and a current gain factor. This calibration method can be performed each time a new optical disk is inserted into the drive to automatically compensate changes in servo system gain caused by changed mechanical, electrical or optical characteristics of the drive, or by changed optical characteristics of the disk.

DETAILED DESCRIPTION OF THE PREFERRED EMBODIMENTS

Figure 1:
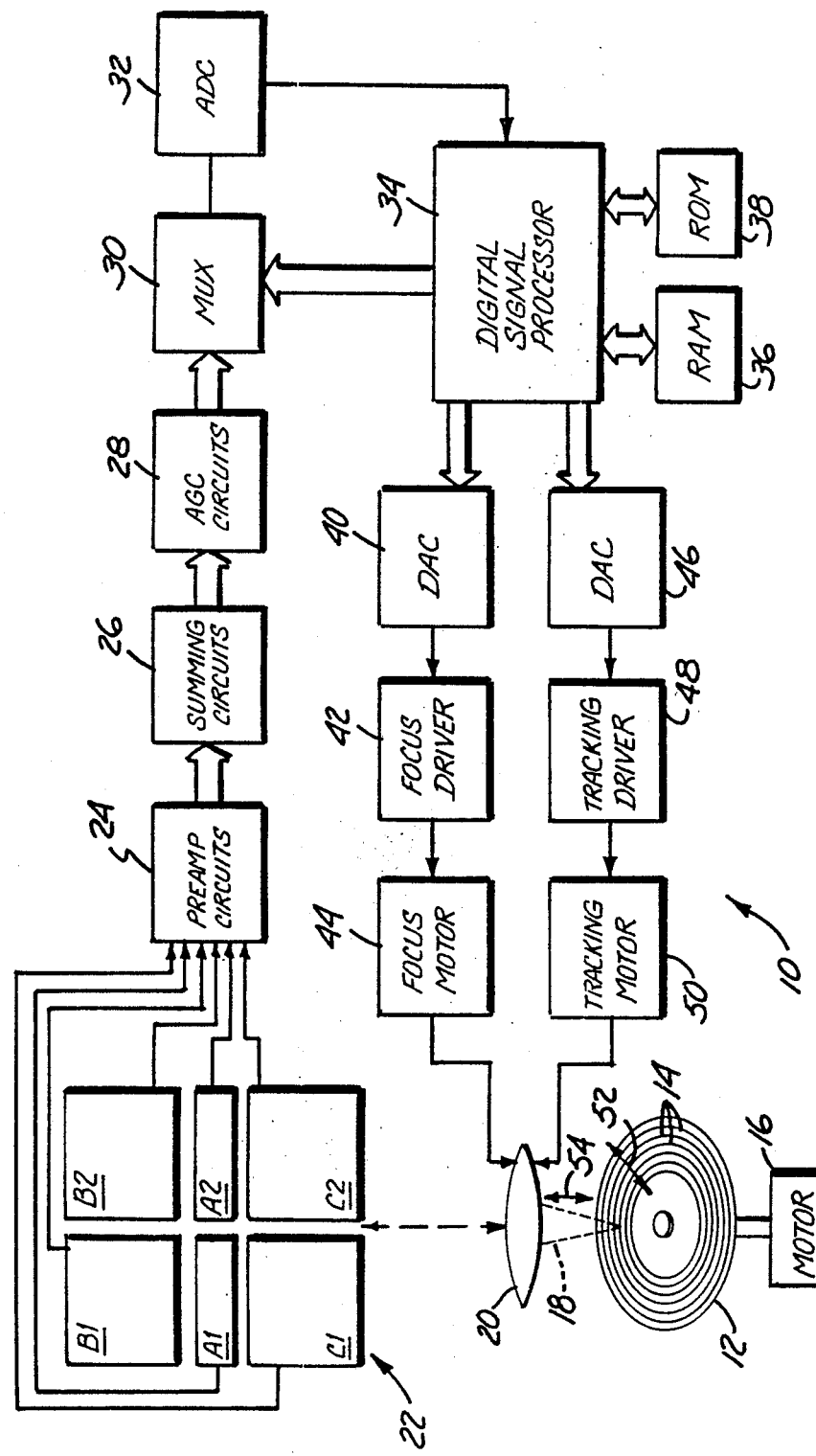
FIG. 1 is a block diagram representation of a magneto-optic disk drive in which the servo system gain compensation method of the present invention can be implemented.

A magneto-optic disk drive 10 in which servo system gain compensation methods in accordance with the present invention can be implemented is illustrated generally in FIG. 1. Disk drive 10 includes a magneto-optic disk 12 which is rotated by motor 16. Digital information is written, read and erased at individual bit positions (not visible) on servo tracks 14 of disk 12 using a laser beam 18. Beam 18 is generated by a laser (not shown) and focused on disk 12 by objective lens 20. The magneto-optic principles upon which disk drive 10 operates are well known, and form no part of the invention per se. When writing or erasing data on servo tracks 14, laser beam 18 is switched to a high or write intensity level while a magnetic bias field having the appropriate write or erase polarity, respectively, is impinged upon the bit positions. Digital information is thereby represented and stored as a function of the magnetic orientation of the bit positions.

Laser beam 18 is switched to a low or read intensity level when information is being read from bit positions on disk 12. After being focused onto servo tracks 14, the polarization angle of the read intensity beam 18 is modulated as a function of the magnetic orientation of the bit positions. The modulated beam 18 is reflected from disk 12 and impinged upon a pair of detectors 22 (only one is shown). In the illustrated embodiment, detector 22 includes six elements A1, A2, B1, B2, C1, and C2. Other detector arrangements are also known. An information signal representative of the digital states of the bit positions is derived differently from the two detectors such as 22 in a known manner.

Disk drive 10 also includes tracking and focus servo systems for accurately positioning objective lens 20 with respect to bit positions of desired servo tracks 14 at which information is to be written, read or erased. Common elements of both the focus and tracking servo systems include objective lens 20, detector 22, preamp (preamplifier) circuits 24, summing circuits 26, AGC (automatic gain control) circuits 28, MUX (multiplexer) 30, ADC (analog-to-digital converter) 32 and digital signal processor 34 and its associated RAM (random access memory) 36 and ROM (read only memory) 38. Elements specific to the focus servo system include DAC (digital-to-analog) converter 40, focus driver 42, and focus motor 44. DAC 46, tracking driver 48, and tracking motor 50 are elements specific to the tracking servo system. The tracking servo system drives and positions objective lens 20 about a tracking axis 52 so as to center laser beam 18 on a desired servo track 14. The focus servo system drives and positions objective lens 20 about a focus axis 54 so as to properly focus laser beam 18 onto magneto-optic disk 12. The closed optical and electrical paths through the tracking and focus servo systems are characterized as servo loops.

After it is focused onto disk 12 and modulated by the bit positions on servo tracks 14, laser beam 18 is reflected back through lens 20 and impinged upon various sections A1, A2, B1, B2, C1, and C2 of detector 22. Detector signals produced by each of these detector sections are individually amplified by preamp circuits 24 and applied to summing circuits 26. Summing circuits 26 combine the detector signals in a predetermined manner to produce a tracking error signal, focus error signal, and hex sum signal. Detector 22 is aligned in such a manner that the elongated space separating detector sections A1, B1 and C1 from sections A2, B2 and C2 is perpendicular to tracking axis 52.

The tracking error signal is produced by summing circuits 26 as a function of the difference between the sum of the signals from detector sections A1, B1, and C1, and the sum of the signals from detector sections A2, B2, and C2 (i.e. A1+B1+C1−A2−B2−C2). The tracking error signal has a generally sinusoidal shape with a polarity and magnitude representative of the direction and distance, respectively, that beam 18 is displaced from the center of a desired servo track 14. The focus error signal is generated as a function of the difference between the sum of the signals from detector sections B1, B2, C1, and C2, and the sum of the signals from detector sections A1 and A2 (i.e. B1+B2+C1+C2−A1−A2). The focus error signal has a generally sinusoidal shape with a polarity and magnitude representative of the direction and distance, respectively, that lens 20 is displaced from its proper focus position. The hex sum signal is the sum of the signals from all six detectors (i.e. A1+A2+B1+B2+C1+C2).

The analog tracking error, focus error, and hex sum signals are each applied to AGC circuits 28. AGC circuits 28 normalize the tracking error signal and focus error signal by dividing these signals as they are received from summing circuits 26 by the hex sum signal. The normalized tracking error signal and focus error signal are individually applied to MUX 30 from AGC circuits 28. MUX 30 is controlled by digital signal processor 34 and selectively routes the normalized focus and tracking error signals to ADC 32. ADC 32 digitizes the focus and tracking error signals, and applies them to digital signal processor 34.

Digital signal processor 34 processes the tracking and focus error signals in a predetermined manner in accordance with a program which can be stored in ROM 38. A digital focus control signal is generated as a function of the focus error signal. The digital focus control signal is applied to DAC 40 and converted to analog form. Focus driver 42 converts the analog focus control signal into a focus drive signal having current characteristics required to drive focus motor 44. In response to the focus drive signals, focus motor 44 drives objective lens 20 about focus axis 54, and positions the lens at locations causing laser beam 18 to be properly focused onto magneto-optic disk 12.

Signal processor 34 generates a digital tracking control signal as a function of the normalized tracking error signal. The tracking control signal is converted to analog form by DAC 46 and applied to tracking driver 48. Tracking driver 48 converts the tracking control signal into a tracking drive signal which is used by tracking motor 50 to drive objective lens 20 along tracking axis 52, and to center the lens over a desired servo track 14. When operated in the closed-loop manner described above, the tracking and focus servo systems accurately position objective lens 20 so data can be reliably written, read and erased at bit positions of disk 12.

Preamp circuits 24, summing circuits 26, AGC circuits 28, MUX 30, ADC 32, DACs 40 and 46, and drivers 42 and 48 are all well known. In one embodiment these elements are configured from discrete integrated circuits. Focus motors such as 44 and tracking motors such as 50 are also generally known. In one embodiment all optical elements of disk drive 10 including objective lens 20 and detector 22 are mounted to a radial arm (not shown). The radial arm is pivotally mounted adjacent disk 12. In response to the tracking drive signals, tracking motor 50 drives the radial arm and objective lens 20 with respect to disk 12. Focus motor 44 drives the objective lens with respect to the radial arm and disk 12. The radial arm, focus motor 44 and tracking motor 50 of this embodiment are described in greater detail in co-pending application Ser. No. 246,776, filed Sept. 20, 1988, entitled "BIAS FIELD SWITCHING MEANS FOR A MAGNETO-OPTIC DISK DRIVE."

Figure 2:
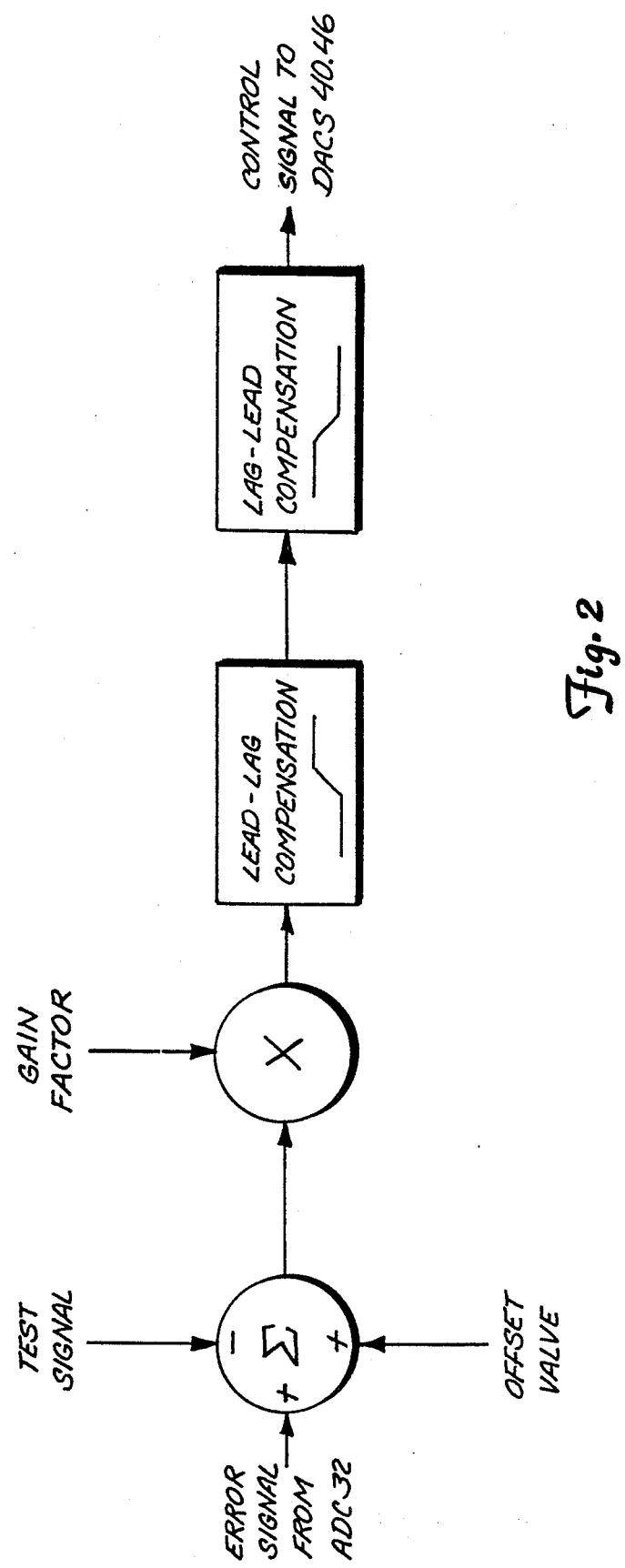
FIG. 2 is a graphic representation of the processing operations performed on tracking and focus error signals by the digital signal processor shown in FIG. 1.

The operations performed on the tracking error signal by digital signal processor 34 are described generally with reference to FIGS. 1 and 2. Upon receipt of the normalized tracking error signal from ADC 32, it is summed with an Offset Value which is stored in RAM 36 or ROM 38. In the embodiment shown in FIG. 2, the normalized error signal is added to the Offset Value. The Offset Value is a numeric value which compensates for electrical, mechanical, and other characteristics of the tracking servo system. The Offset Value for the tracking servo system is typically selected and stored during the initial calibration of disk drive 10, following its assembly.

The tracking error signal is also multiplied by a Gain Factor to control the bandwidth of the tracking servo system. The Gain Factor is a numeric value stored in RAM 36. In the embodiment shown, the tracking error signal is multiplied by the Gain Factor after it has been summed with the Offset Value. As will be discussed below, the Gain Factor for the tracking servo system is periodically adjusted to maintain proper gain compensation of the servo system.

Digital signal processor 34 also filters or frequency compensates the tracking error signal before it is outputted as the tracking control signal. In the illustrated embodiment the tracking error signal is both lead-lag and lag-lead compensated after it has been multiplied by the Gain Factor. In one embodiment the tracking servo system has a bandwidth of from 0 to 4 KHz, with a gain of one at 4 KHz.

Figure 3:
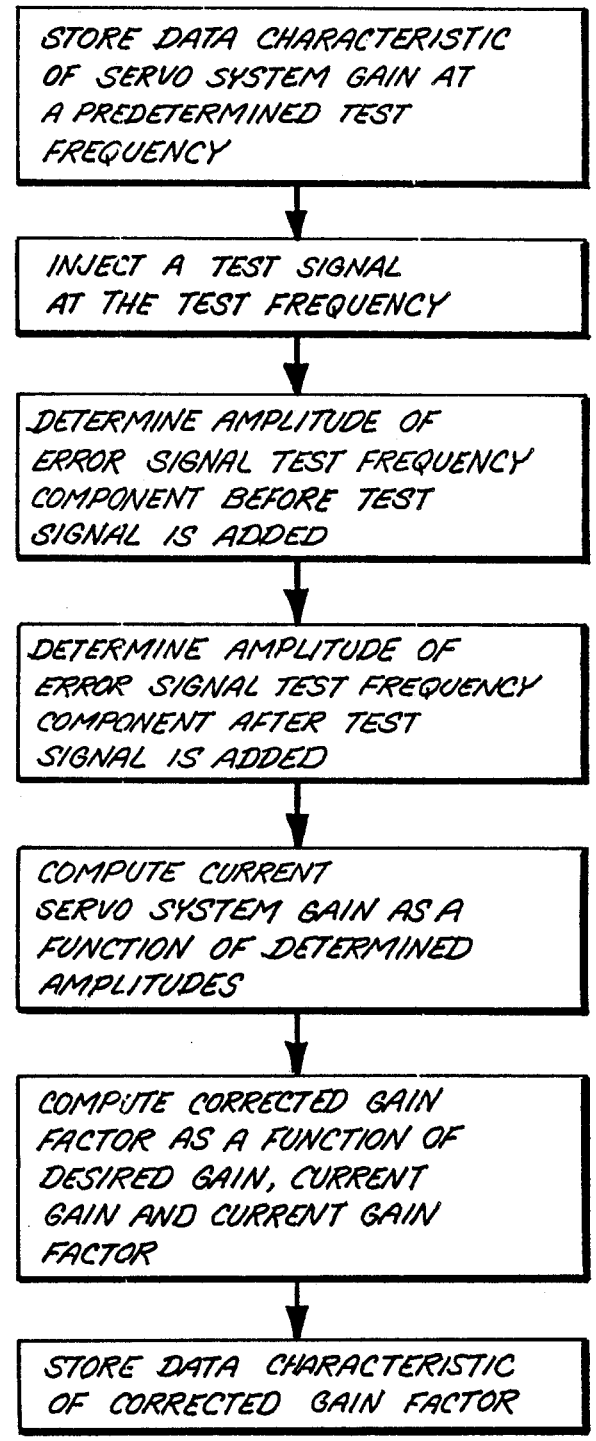
FIG. 3 is a flow chart illustrating the sequence of steps performed by the digital signal processor to compensate servo system gain in accordance with the present invention.

The closed-loop operational characteristics or transfer function of the tracking servo system are dependant upon the optical and electrical characteristics of its components. These characteristics change with component age, and vary with different components such as different disks 12. Digital signal processor 34 periodically and automatically compensates or adjusts the tracking servo system gain and bandwidth by adjusting the tracking servo system Gain Factor. The Gain Factor can be adjusted each time a new magneto-optic disk 12 is inserted into drive 10, or at other predetermined times such as when the detected read or write error rate exceeds a predetermined acceptable level. The sequence of steps executed by digital signal processor 34 to perform the gain compensation routine is illustrated in FIG. 3.

To perform the gain compensation routine, digital signal processor 34 uses data characteristic of the desired tracking servo system open-loop gain at a predetermined compensation test frequency within the servo system bandwidth. Data characteristic of the desired servo system gain at the test frequency is stored in RAM 36 or ROM 38. In one embodiment, digital signal processor 34 utilizes stored data which characterizes the desired tracking servo system gain as being equal to one (0db) at a test frequency equal to the four KHz upper bandwidth limit of the servo system.

The tracking servo loop is broken by injecting a disturbance or test signal which is summed with the tracking error signal, at some point within digital signal processor 34. The test signal has frequency components equal to the test frequency associated with the stored tracking servo system loop gain value. In one embodiment a sinusoidal test signal at the test frequency is injected into the servo loop by summing it with the tracking error signal along with the Offset Value. In the embodiment shown in FIG. 2 the test signal is subtracted from the Offset Value and tracking error signal. Signal processor 34 can be programmed to generate the sinusoidal test signal by means of a look-up table, or by operating an oscillator.

After the summed tracking error and test signals have been propagated through the tracking servo system, the current gain of the servo system at the compensation test frequency is determined. In preferred embodiments, digital signal processor 34 makes this calculation as a function of the test frequency amplitude component in the tracking error signal before the test signal is injected, and immediately after the test signal is injected (i.e., the relative error signal amplitudes at the test frequency before and after the summing junction). To perform this operation, digital signal processor 34 can bandpass filter the error signal at the test frequency before and after it is summed with the test signal, and sample the two filtered signal components to determine their peak-to-peak amplitudes. The ratio of the amplitude of the error signal before the test signal is added to the amplitude of the error signal after the test signal is added will equal the current servo system gain (i.e., the transfer function or servo system response at the compensation test frequency).

Digital signal processor 34 then compares the computed current servo system gain to the desired servo system gain to determine the extent to which the tracking Gain Factor must be adjusted. If the current servo system gain is greater than the desired gain, the Gain Factor must be lowered by a proportional amount. Similarly, the Gain Factor must be increased by a proportional amount if the desired gain is greater than the current servo system gain. Digital signal processor can compute the required Gain Factor as a function of a current value of the Gain Factor and a ratio of the desired servo system gain to the current system gain. In one embodiment digital signal processor 34 determines the current gain of the tracking servo system at a test frequency of four KHz. Since the desired servo system gain at this test frequency is one as described above, the required Gain Factor can be computed by dividing the current gain factor by the current gain of the servo system. The newly computed Gain Factor is then stored in RAM 36, and used by signal processor 34 when processing tracking error signals during normal closed-loop operation. Digital signal processors such as 34 are well known and commercially available. Persons skilled in the art can program processor 34 to operate in the manner described herein.

Although only the tracking servo system gain compensation method has been described above in detail, it is to be understood that the focus servo system operates in an identical manner, and can be gain compensated in the same manner as the tracking servo system. Specific parameters used by the focus servo system when operating in its normal closed-loop mode or gain compensation routines, including its associated Offset Value and Gain Factor, will be different from corresponding values in the tracking servo system as a result of differing mechanical, electrical and optical characteristics of the focus servo system.

Tests have shown that the bandwidth of both the tracking and focus servo systems can be accurately adjusted in the manner described above. It has been found to be unnecessary to repeat the gain compensation routine to determine whether the loop gain has been brought within required tolerances once the routine has been implemented. However, these actions can be undertaken if desired. Through use of the gain compensation method of the present invention, it is possible to quickly and accurately compensate the tracking and focus servo systems. Since these gain compensation methods are performed automatically and do not require test instrumentation, they facilitate the adaptable use of disk drive 10. Different disks 12 can be used without the loss of any performance from drive 10.

Although the present invention has been described with reference to preferred embodiments, workers skilled in the art will recognize that changes may be made in form and detail without departing from the spirit and scope of the invention.

What is claimed is:

1. A method for operating programmable processing means in an optical disk drive to compensate servo system gain, including:
    receiving a servo error signal;
    outputting a servo control signal;
    storing data characteristic of a desired servo system gain at a predetermined test frequency;
    generating a test signal at the test frequency;
    summing the test signal and the servo error signal;
    determining current servo system gain at the test frequency;
    computing a gain factor as a function of the current servo system gain and desired servo system gain;
    storing data characteristic of the gain factor; and
    multiplying the servo error signal by the gain factor so the servo system gain equals the desired servo system gain.

2. The method of claim 1 wherein generating the test signal includes generating a sinusoidal test signal at the test frequency.

3. The method of claim 1 wherein summing the test signal includes subtracting the test signal from the servo error signal.

4. The method of claim 3 and further including adding an offset valve to the servo error signal.

5. The method of claim 1 wherein determining current servo system gain includes:
    determining amplitude of the servo error signal before it is summed with the test signal;
    determining amplitude of the summed servo error signal and test signal; and
    computing current servo system gain as a function of the amplitude of the servo error signal and the amplitude of the summed servo error signal and test signal.

6. The method of claim 5 wherein computing current servo system gain includes computing a ratio of the amplitude of the servo error signal and the amplitude of the summed servo error signal and test signal.

7. The method of claim 1 wherein computing the gain factor includes computing the gain factor as a function of current servo system gain, desired servo system gain, and a current gain factor.

8. The method of claim 1 and lead-lag compensating the error signal before outputting the servo control signal.

9. The method of claim 1 and lag-lead compensating the error signal before outputting the servo control signal.

10. The method of claim 1 and periodically repeating the steps of determining current servo system gain, computing the gain factor and storing data.

11. The method of claim 10 and repeating the steps of determining servo system gain, computing the gain factor and storing data each time a disk is inserted into the drive.

12. The method of claim 10 and repeating the steps of determining servo system gain, computing the gain factor and storing data each time an error rate exceeds a predetermined error rate.

13. In an optical disk drive tracking and/or focus servo system of the type including:
    an optical disk having servo tracks at which data is written to and read from;

an objective lens for focusing a laser beam onto the optical disk;

a focus actuator for driving and positioning the objective lens about a focus axis with respect to the optical disk in response to focus control signals;

a tracking actuator for driving and positioning the objective lens about a tracking axis with respect to the optical disk in response to tracking control signals;

an optical detector for detecting portions of the laser beam modulated by data on the optical disk;

circuit means coupled to the optical detector for generating a focus servo error signal and/or a tracking servo error signal; and programmable digital signal processor and associated memory for controlling the closed-loop response of the tracking and/or focus servo systems by processing the focus and/or tracking servo error signals and outputting the focus and/or tracking control signals by summing each error signal with an offset value and multiplying each error signal by a gain factor;

a method for periodically operating the digital signal processor to compensate for tracking and/or focus servo system gain, including:

storing data characteristic of a desired servo system gain at a predetermined test frequency;

generating a test signal at the test frequency;

summing the test signal with the servo error signal;

determining current servo system gain at the test frequency;

computing a corrected gain factor as a function of the current servo system gain, desired servo system gain, and current gain factor; and storing the corrected gain factor.

14. The method of claim 13 wherein generating the test signal includes generating a sinusoidal test signal at the test frequency.

15. The method of claim 13 wherein summing the test signal includes subtracting the test signal from the servo error signal.

16. The method of claim 13 wherein determining current servo system gain includes:

determining amplitude of the servo error signal before it is summed with test signal;

determining amplitude of the input servo error signal and summed servo error and test signal; and computing current servo system gain as a function of the amplitude of the servo error signal and the amplitude of the summed servo error signal and test signal.

17. The method of claim 16 wherein computing current servo system gain includes computing a ratio of the amplitude of the servo error signal and the amplitude of the summed servo error signal and test signal.

18. The method of claim 13 and lead-lag compensating the error signal before outputting the servo control signal.

19. The method of claim 13 and lag-lead compensating the error signal before outputting the servo control signal.

20. The method of claim 13 wherein the digital signal processor repeats the method each time a disk is inserted into the drive.

21. The method of claim 13 wherein the digital signal processor repeats the method each time a detected error rate exceeds a predetermined error rate.

* * * * *